United States Patent [19]

Beyrle et al.

[11] Patent Number: 5,492,951
[45] Date of Patent: Feb. 20, 1996

[54] PRIMING COMPOSITION FOR THE TREATMENT OF A GLASS, TREATED GLASS, AND PROCESS FOR SAID TREATMENT

[75] Inventors: André Beyrle, Trancy-le-Val; Philippe Armand, Paris, both of France

[73] Assignee: Saint Gobain Vitrage International, Courbevoie, France

[21] Appl. No.: 74,443

[22] Filed: Jun. 10, 1993

[30] Foreign Application Priority Data

Jun. 10, 1992 [FR] France .................... 92 06953

[51] Int. Cl.⁶ .................. C08K 5/54; C08G 77/04
[52] U.S. Cl. ............. 524/188; 106/287.1; 106/287.11; 106/287.26; 428/425.5; 428/447; 524/392; 524/730; 525/440; 525/453; 525/460; 528/28; 528/29
[58] Field of Search .................. 524/188, 392, 524/730; 528/28, 29; 525/440, 453, 460; 106/287.1, 287.11, 287.26; 428/425.5, 447

[56] References Cited

U.S. PATENT DOCUMENTS

| 3,309,261 | 3/1967 | Schiller et al. | 525/453 |
| 3,542,718 | 11/1970 | Davis et al. | 55/453 |
| 4,067,844 | 1/1978 | Barron et al. | 525/453 |
| 4,430,486 | 2/1984 | Chang et al. | 525/540 |
| 5,225,512 | 7/1993 | Baghdachi et al. | 528/28 |
| 5,234,996 | 8/1993 | Mori et al. | 525/453 |
| 5,272,224 | 12/1993 | Baghdachi et al. | 524/730 |

FOREIGN PATENT DOCUMENTS

| 241337A | 9/1993 | European Pat. Off. . |
| 603073A | 8/1994 | European Pat. Off. . |

*Primary Examiner*—Nathan M. Nutter
*Assistant Examiner*—John M. Cooney, Jr.
*Attorney, Agent, or Firm*—Oblon, Spivak, McClelland, Maier, & Neustadt

[57] ABSTRACT

The invention relates to a process for the treatment of the periphery of a glass, more particularly an encapsulated glass, which consists of treating part of the surface of the glass by at least one silane and a composition able to form a layer having free OH groups. This process is useful for treating glass so that a resin, such as a polyurethane, upon contact with the treated glass will readily adhere and bond to the glass. The treated glass can be fitted into car body bays or openings.

11 Claims, No Drawings

PRIMING COMPOSITION FOR THE TREATMENT OF A GLASS, TREATED GLASS, AND PROCESS FOR SAID TREATMENT

BACKGROUND OF THE INVENTION

1. Field of the Invention

The present invention relates to a priming composition comprising (i) at least one silane and (ii) a composition able to form a layer having free OH groups. The priming composition according to the present invention is useful for treating a glass, or part of a glass, so that a resin, such as a polyurethane, upon contact with the treated glass will readily and easily adhere and bond.

The present invention also relates to a process for treating a glass ready to be fitted by bonding in a car body bay or opening with such a priming composition.

2. Description of the Prior Art

The adhesion of a resin, such as a polyurethane, onto the border of a glass permits the glass to be easily bonded into car body bays. The use of resin-bordered glass offers numerous advantages over untreated glass. In particular, when exposed to violent shocks, resin-bordered glass holds in place better. Resin-bordered glass also fits flush against the car body, reducing the penetration coefficient for air into the vehicle.

Resins are commonly bonded to glass by two different methods. The first method consists of bonding the resin directly to the glass or to an enamelled border at the limit of the potted profile of the glass. A second method consists of directly bonding the resin to the potted profile of the glass.

The first method is presently used in the car industry and consists of first depositing on an enamelled surface, at the limit of the potted profile, a precoating incorporating silanes and then subsequently depositing an adhesion primer. An adhesion joint or resin is then bonded to the primer coated glass.

Unfortunately, this procedure suffers from several disadvantages. Firstly, the adhesion primer only remains reactive for a few days. Unfortunately, primer coated glass is typically produced by manufacturers different from those responsible for applying resin to the glass and for subsequently fixing the resin coated glass into car body bays. Typically, the silane precoat and the adhesion primer are deposited on the glass by the glassmaker and the glass is then stored for several days before being installed. After storage, the primer coated glass must be reactivated before resin can be bonded to it. This supplementary step slows the installation of the glass into the body bays. Further, the reactivation step is difficult to automate and result is a loss of productivity on assembly lines.

SUMMARY OF THE INVENTION

Accordingly one object of the present invention is to provide a priming composition useful for treating a glass. This priming composition allows the glass to be bonded to a resin and thereafter into a car body bay without the necessity for reactivating the primer coating, even after storage for several months.

A second object of the present invention is to provide a glass treated with the priming composition of the present invention.

A third object of the present invention is to provide a process for treating a glass with the priming composition of the present invention.

DETAILED DESCRIPTION OF THE PREFERRED EMBODIMENTS

The present inventors have found that the problems associated with existing adhesion primers which must be reactivated, are overcome by treating a glass surface with a priming composition comprising (i) at least one silane and (ii) a composition able to form, after at least partial polymerization, a layer having free OH groups.

The priming composition is suitably deposited on the glass surface with mats or pads impregnated with (i) and (ii). The amounts of (i) and (ii) deposited can vary; typically the thickness of the layer obtained is of from 10 to 50 µm.

This treatment enables the glass to adhere to a resin even after prolonged storage. This treatment is particularly suitable for encapsulated glass such as glass having a potted peripheral profile (or an encapsulation joint), which is intended to replace a finishing joint. This treatment is particularly suitable for glass with a peripherally enamelled surface. When the glass has an enamelled area, for example, on the peripheral border, the treatment preferably takes place on this area. This treatment is also suitable for glass lacking a potted profile and glass equipped with an extruded profile.

Suitable silanes useful in the practice of the present invention include aminosilanes, mercaptosilanes, and isocyanatosilanes.

Suitable compositions able to form a layer having free OH groups useful in the practive of the present invention are composed of polyurethanes. Suitable polyurethanes according to the present invention are composed of a polyol component in excess of an isocyanate component. Preferably, the ratio of NCO groups to OH groups is below 1 molar equivalents and preferably between 0.3 and 0.99 molar equivalents.

Alternatively, the composition able to form a layer having free OH groups can suitably be a composition incorporating an epoxy resin having (i) a component with an isocyanate function and (ii) a component with a polyol function. In another variant, the composition able to form a layer having free OH groups can be a polyoxazolidone resin obtained by condensing an isocyanate on an excess of an epoxy resin, in the presence of a quaternary ammonium salt catalyst.

Suitable isocyanate components according to the present invention are members of the group consisting of aliphatic or aromatic difunctional isocyanates such as hexamethylene diisocyanate 2,2,4-trimethyl-1,6-hexamethylene, diisocyanate, bis (4-isocyanatocyclohexyl)methane, isocyanato-1,3-isocyanatomethyl-3,5,5-trimethyl cyclohexane (IPDI), toluylene diisocyanate (TDI); isocyanates having a functionality higher than 2, such as isocyanate biurets; isocyanurates; and partly polymerized diisocyanato diphenyl methane having a functionality between 2 and 3.

In a preferred embodiment of the invention, the isocyanate component is an aliphatic isocyanate. Priming compositions comprising aliphatic isocyanates are less sensitive to ultraviolet than aromatic isocyanates. Thus, priming compositions composed of aromatic isocyanates are suitably colored black to protect them against ultraviolet. Priming compositions composed of aliphatic isocyanates need not be colored.

Suitable polyol components useful in the present invention are composed of at least one polyol selected from the group consisting of long polyols with a molecular weight between approximately 400 and 4000. Preferably polyether diols, polyester diols and polycaprolactone diols are used.

Advantageously, the polyol component comprises at least one long polyol as referred to hereinbefore and at least one diol with a lower molecular weight than the long polyol diols. Such lower molecular weight diols are generally used as chain extenders in the preparation of polyurethanes. Suitably, the diol is a substituted or unsubstituted member of the group consisting of ethylene glycol, 1,2-propane diol, 1,3-propane diol, 1,2-1,3-1,4-butane diol, 2,2-dimethyl-1,3-propane diol (neopentyl glycol), 1,5-pentane diol, 1,6-hexane diol, 1,8-octane diol, 1,10-decane diol, 1,12-dodecane diol, cyclohexane dimethanol, bisphenol A, 2-methyl-2,4-pentane diol, 3-methyl-pentane- 2,4-diol, 2-ethyl-1,3-hexane diol, 2,2,4-trimethyl-pentane- 1,3-diol, diethylene glycol, triethylene glycol, tetraethylene glycol, 2-butyne-1,4-diol, 1,4-butene diol and decyne diol, in substituted and/or etherified form; hydroquinone-bis-hydroxyethyl ether; bisphenol A etherified by two or four propylene oxide groups, and dimethylol propionic acid.

The polyol component can alternatively be formed by a polyol having a functionality higher than two, such as monomeric aliphatic triols such as glycerol, trimethylol propane, triols with polyether chains, polycaprolactone triols. The molecular weight of these triols is suitably between 90 and 1,000. Mixed polyether/polyester polyols with a functionality higher than 2 can also be used, preferably the functionality is between 2 and 3.

The polyol with a functionality higher than 2 can be used alone, particularly when its molecular weight exceeds approximately 400. In a variant, it can be admixed with at least one long, difunctional polyol and/or with at least one short diol.

According to another embodiment of the invention, the polyol component can comprise at least one polyvinylchloride copolymer (PVC) having free hydroxyl groups. This copolymer can be used alone or admixed with one or more of the aforementioned polyols.

Suitable PVC copolymer with hydroxyl groups useful in the present invention include resins of the following formula:

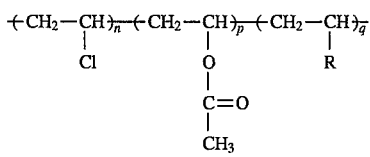

where the n unit is a vinyl chloride unit, the p unit is a vinyl acetate unit, and the q unit is a vinyl alcohol unit when R is OH and a hydroxyethyl acrylate unit when R is a group of the formula $COOCH_2CH_2OH$.

Suitable PVC copolymers have molecular weights between approximately 1,000 and 100,000, preferably between approximately 2,000 and 50,000. Suitably, the PVC copolymer contains approximately 20 to 95% by weight, based on the final weight of the polymer, vinylchloride units; approximately 2 to 40% by weight, based on the final weight of the polymer, vinyl acetate units; and approximately 2 to 40% by weight, based on the final weight of the polymer, vinyl alcohol or hydroxyethyl acetate units.

In another embodiment of the invention, the (ii) composition able to form a layer having free OH groups comprises (i) silanes. In this embodiment, the (i) silane(s) are admixed with the (ii) composition able to form a layer having free OH groups. Suitable silanes are described above. In this embodiment of the invention, the treatment is carried out in a single stage such that the mixture is applied to the glass and after partial or complete polymerization a layer having free OH groups is formed.

The primer composition of the present invention is typically protected against external light as it is ultraviolet-sensitive. In a preferred embodiment of the invention, the enamelled area on the border of the encapsulation joint is treated by the composition to protect it against external light.

The primer composition of the present invention can suitably be polymerized thermally by heating the treated glass at a high temperature for a short period of time. Preferably, a temperature of approximately 80° to 120° C. is used for approximately 1 to 30 minutes. Polymerization can alternatively be carried out at ambient temperature, preferably at approximately 20° to 25° C., for a much longer time, preferably at least 24 hours. Alternatively, other intermediate thermal polymerization cycles can also be used. Fast polymerization is preferred because it provides a greater ease of handling the treated glass. Polymerization of the priming composition can alternatively be carried out by treatment with microwaves, vapor phase catalysis, or radiation.

Other features and advantages of the invention can be gathered from the following description of an example of a glass and a treatment according to the invention.

EXAMPLES

An encapsulated glass was produced, which had a peripherally enamelled surface for a car, for use as a side window, using the reactive injection molding process (RIM). RIM is a process in which the injected potting material is a reaction mixture, which reacts and hardens in the mold. The potting material was a mixture of components able to form a polyurethane joint or profile.

After drying for a few minutes at ambient temperature, a silane-based solution is applied with the aid of a mat or pad to the enamelled surface remaining on the border of the encapsulation joint Subsequently, a composition prepared beforehand from a mixture of an isocyanate component, namely diphenyl diisocyanate methylene, which is partly polymerized and has a functionality between 2 and 3, and a polyol component incorporating polypropylene glycol with a molecular weight of 440 and 1,4-butane diol is applied using a mat or pad to the area pretreated with the silane-based solution. The thickness of the layer obtained was between 10 and 50 μm.

The components are used in quantities such that to 0.8 equivalent of isocyanate are present per 1 equivalent of OH, whereof 0.3 equivalent is supplied by the polypropylene glycol and 0.7 equivalent by the 1,4-butane diol.

This reaction composition was prepared by mixing 32.7 g polypropylene glycol with 15.3 g 1,4-butane diol. Methyl ethyl ketone was added so that the final polyurethane concentration was approximately 20%. To the above mixture was added 0.3 g of a catalyst, dibutyl tin dilaurate (DBTL). This was followed by the addition of 52 g partly polymerized methylene diphenyl diisocyanate.

After spreading on the glass, the primer composition was polymerized by heating the treated glass in an enclosure at 120° C., for approximately 5 minutes which gave a skin temperature of approximately 85° C.

The thus obtained encapsulated glass was ready for fitting by bonding in a body bay. This bonding readiness was maintained for a long storage period of several months.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A priming composition for the adhesion of a polyurethane to glass, comprising (i) a silane and (ii) a composition able to from a layer with free OH groups which is composed of a polyol component and an isocyanate component, wherein said polyol component comprises at least one polyvinylchloride copolymer having free hydroxyl groups and is in excess compared with said isocyanate component.

2. The priming composition according to claim 1, wherein the ratio of NCO groups to OH groups is between 0.3 and 0.99.

3. The priming composition according to claim 1, wherein said isocyanate component is methylene diphenyl diisocyanate.

4. The priming composition according to claim 1, wherein said isocyanate component is an aliphatic isocyanate.

5. The priming composition according to claim 1, wherein said polyol component comprises a long polyol and a short diol.

6. The priming composition according to claim 5, wherein said polyol component comprises a polyol having a functionality higher than 2.

7. The priming composition according to claim 1, wherein said polyvinylchloride copolymer has the following formula:

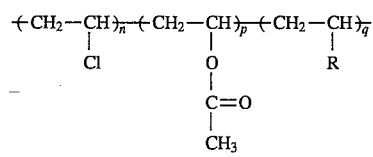

where R is OH or COOCH$_2$CH$_2$OH;

said copolymer has a molecular weight between approximately 1,000 and 100,000; and the values of n, p and q are such so that it is composed of approximately 20 to 95% by weight, based on the total weight of said copolymer, vinylchloride units, approximately 2 to 40% by weight, based on the total weight of said copolymer, vinyl acetate units, and approximately 2 to 40% by weight, based on the total weight of said copolymer, vinyl alcohol or hydroxyethyl acrylate units.

8. The priming composition according to claim 1, wherein said polyvinyl alcohol copolymer has a molecular weight between approximately 2,000 and 50,000.

9. The priming composition according to claim 1, wherein said silane(s) are admixed with said composition able to form a layer with free OH groups.

10. The priming composition according to claim 1, wherein said silane is selected from the group consisting of aminosilanes, mercaptosilanes, and isocyanatosilanes.

11. The priming composition according to claim 1, consisting essentially of the defined components (i) and (ii).

* * * * *